March 8, 1932.    J. C. STIMSON    1,848,675
REFLECTING DEVICE
Original Filed Feb. 5, 1925
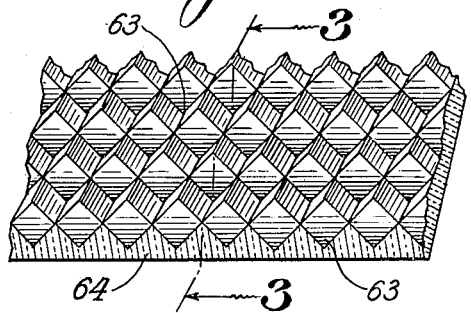
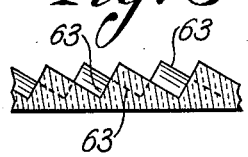
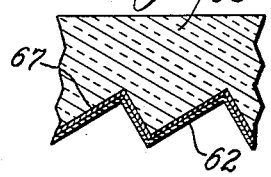
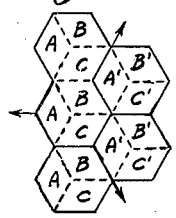
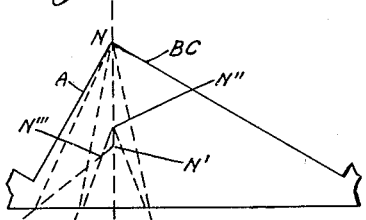
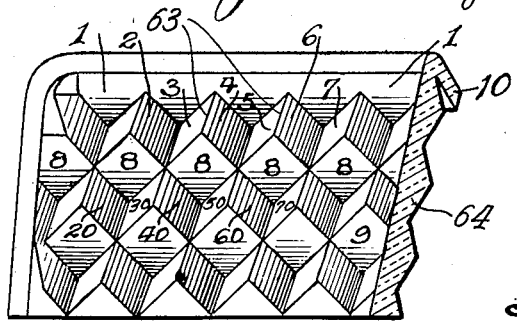
Inventor:
Jonathan C. Stimson,
By John H. Bruninga
His Attorney.

Patented Mar. 8, 1932

1,848,675

UNITED STATES PATENT OFFICE

JONATHAN C. STIMSON, OF UNIVERSITY CITY, MISSOURI

REFLECTING DEVICE

Original application filed February 5, 1925, Serial No. 7,164. Divided and this application filed March 3, 1926. Serial No. 92,024.

This invention relates to reflectors and more particularly to reflecting devices adapted for use as signals and employing the principles and characteristic features of central triple reflectors. This application is a division of application Serial Number 7,164, filed February 5, 1925, now Patent #1,591,572, July 6, 1926.

If three reflecting surfaces are arranged to intersect at a common point with the reflecting surfaces at right angles to each other so as to form, in effect, the corner of a cube, the diagonal of the cube being designated the axis of the reflector, then a beam incident on such a device from any one of a wide variety of inclinations to the axis is reflected from surface to surface about the axis or center of the device and back along the incident beam; it may, therefore, be called a central triple reflector. Where the reflecting surfaces form the three square sides of a cube, then the aperture is wholly active for the reflection of beams normal thereto. The triple reflector heretofore practically employed, whether as a separate unit or as the reflectors of a multiple unit reflector, is not, however, of this latter form; rather it is the corner of a cube bounded by the diagonals of the three adjacent sides of the cube forming the reflector. This is true whether the reflector is of the hollow or of the solid (glass) type, although in the latter case portions of the outer extremities of the tetrahedral body may be truncated perpendicular to the plane front face of the reflector; in such a truncated structure, however, the reflecting surfaces of the several units are not similarly oriented so that the reflector is limited in its applications; moreover, such a truncated structure presents difficulties in its manufacture. A central triple reflector comprising the three square faces of a cube cannot exist with a fourth plane surface bounding the reflector aperture, and enclosing or completing the structure as is true with the central triple reflector having a triangular aperture.

One of the objects of this invention is to provide a reflector of the character described having new, improved and valuable qualities and functions.

Another object is to provide such a reflector in which adjacent reflecting surfaces, and more particularly those which merge, are similarly oriented.

Another object is to provide a reflector of the character described, in which the maximum range of inclination of corresponding units is the same throughout the reflector while the unit apertures are wholly effective for reflection of normal beams.

Another object is to provide a reflector of the character described in which the units are arranged in continuous merging series with the units similarly oriented so as to have the same maximum range of inclination.

Further objects will appear from the detailed description taken in connection with the accompanying drawings, in which:

Figure 1 is a face view showing a reflector embodying this invention;

Figure 2 is a rear perspective view partly in section.

Figure 3 is a detail section on line 3—3, Figure 2.

Figure 4 is a diagram;

Figure 5 is an optical diagram; and

Figure 6 is a section showing another embodiment.

Referring to Figures 1 and 2 which are views of a pressed glass multiple unit reflector embodying this invention, it will be seen that this reflecting structure consists of a series of cube like formations which are not the diagonal corners of cubes, but exist in an integral plate, with each reflector unit consisting of the three full sides of a cube. The reflector thus comprises a series of central triple reflecting units arranged to form merging reflecting areas.

It is a quality of central triple reflectors as described herein that incident beams lying in a plane which bisects one of the dihedral angles of the reflector may be inclined from the axis at a greater angle in one direction than in the other before return reflection is lost. In the case of hollow central triple reflectors the maximum range of inclination of incident beams is toward the dihedral angle, and the smaller range of inclination is toward the reflecting surface opposite the dihedral angle. In the case of solid transparent central triple reflectors of isotropic material coated with a metallic reflecting medium, the maximum range of inclination is again toward the dihedral angle, both the maximum range and the smaller range of inclination being greater than in the hollow type on account of refraction.

But in the case of solid transparent central triple reflectors of isotropic material whose reflecting surfaces are not coated with a metallic reflecting medium, an additional factor not otherwise limiting the functioning of the central triple reflector is introduced; this factor being the critical angle beyond which total reflection does not occur. Because of this factor the smaller range of inclination is toward the dihedral angle and the maximum range is towards the reflecting surface opposite the dihedral angle instead of toward the dihedral angle as in the first two cases mentioned.

In order to have the largest possible functioning reflecting area where the source of light to be reflected is at an angle from the axis greater than the smaller range of inclination, it is necessary to have the triple reflecting units so arranged that the maximum range of inclination for all the units or all the units in a series lies towards the same side of the reflector.

This invention provides a reflector having such qualities. Figure 4 is a plan view, with the plane face in the plane of the paper, of five of the triple reflecting units of the reflector, Figure 1, which is constructed of an isotropic transparent medium such as glass, whose reflecting surfaces are uncoated. The reflecting surfaces A of the three unit reflectors which lie in a line perpendicular to the horizontal margin of the paper, lie in the same plane; and the corresponding surfaces A' of the reflecting units in the adjacent parallel line lie in a plane parallel to the plane of surfaces A. It follows that all of the unit reflectors making up a complete reflector have the same orientation so that the maximum range of inclination of all units lie towards the same side. This is further illustrated in Figure 5. The surface A lies in a plane perpendicular to the paper and the line B C is the line of intersection of the surfaces of the dihedral angle formed by B and C and lies in the plane of the paper. The surface A forms an angle of about 35 degrees with the axis M N and fixes the maximum range of inclination. This maximum range of inclination when resolved for glass having an index of refraction of 1.51 is about 60 degrees from the perpendicular, indicated by the angle M N' O. The smaller range of inclination lies in the same plane as the maximum range upon the other side of the axis M N. This is indicated by the dotted line N" P when resolved for refraction and is fixed by the critical angle for the isotropic medium employed. For glass with an index of 1.51 this smaller range of inclination is about 20 degrees, indicated by the angle M N" P.

As the reflecting surfaces A and A', Figure 4, of all of the units lie in the same or parallel planes the maximum range of inclination (the angle M N' O) is to the left of the axis of each of the respective units. The practical importance of this is illustrated by assuming that half of the units comprising the reflector had surfaces with the opposite orientation, i. e. with the surface A located to the right instead of to the left of the axis M N. These units would then have the limiting inclination M N" P' to the left of the axis. Light originating from points within the angle O N"' P' would then be reflected back toward the source from only half of the reflector units comprising the complete reflector.

As the three reflecting surfaces A, B, C, of a reflecting unit have the same relation to their respective opposite dihedral angles it follows that there are three positions which may be given the reflector with respect to a light source so that the maximum range of inclination is secured. These directions are indicated in Figure 4 by the arrows. For rays of angular incidence to the axis from other than these three directions the limiting inclination for return reflection lies between the maximum range and the smaller range of inclination.

The reflector thus comprises a multiplicity of reflecting units, each of which is a central triple reflector; formed by the three adjacent square faces of a cube, and it is a quality of such a central triple reflector that all of its aperture is effective for the triple reflection of normal beams. It follows that all of the aperture of the reflector is effective for the reflection of normal beams and its efficiency is correspondingly much greater than that of a reflector whose individual central triple reflecting units are not true central triple reflectors but whose reflecting surfaces are isosceles triangles which are the diagonal corners of a cube, and the aperture of each of which is only two-thirds effective for the triple reflection of normal beams.

While a solid transparent reflector as described is particularly advantageous, it will be understood that it may be of the hollow type as shown in Figure 6, formed by depositing a coating 67 of silver on a matrix 65 (which may be of the form shown in Figures 1 and 2) and providing a heavy backing 62 of a metal such as copper and then removing the matrix 65. The appearance of such a hollow reflector can be readily understood by considering the surfaces of Figure 2 as silver reflecting surfaces. As heretofore described, it is to be noted that the maximum range of inclination is on the opposite side of the axis, for the same orientation, from the maximum range of the uncoated solid reflector. With this difference the advantages accruing from having all the units of the structure similarly oriented are common to both the solid, whether silvered or unsilvered, and silvered hollow reflector.

The unsilvered solid-triple reflector, after the maximum range of inclination is reached, and the hollow or silvered solid-triple reflector after either the maximum or smaller range is reached, is an effective reflector for the single or double return reflection of beams which originate from certain points of angular incidence; this single or double, depending upon the orientation of the surfaces, reflection taking place at the limit of triple reflection, is of practical value in extending the maximum range beyond the limits described above in detail. This is of especial value in the reflector as shown in which all of the unit reflectors have their surfaces similarly oriented, and all remain effective for the return reflection of beams originating from a source located at the maximum range of the unsilvered solid plate reflector, described particularly in connection with Figures 4 and 5.

The reflector as has already been mentioned, has both interior and exterior solid angles which are trihedral and complimentary. The interior angles 63 are, therefore, pointed depressions (in the case of a solid prismatic transparent reflector) which may be considered as wedging or pushing forward toward the front face of the reflector 64, but widening or recessing sufficiently in the reverse direction to form a mass of material about the entire series of surfaces which serves to hold the plate together even though the points extend practically up to the face 64. By so constructing the plate the material employed is reduced to the minimum necessary to complete the reflecting structure itself, there being no excess material such as occurs in other reflectors. Besides resulting in economy of material this makes it possible to reduce the amount of shrinkage in pressing the plate proportional to the reduction in the mass and, therefore, to more accurately control the shrinkage in pressing the reflector plate. A further advantage is a reduction in loss of light through absorption because of the shorter distance the light has to travel through the isotropic medium of the reflector.

In the reflector described, the reflecting surfaces of each unit are square, while corresponding reflecting surfaces of adjacent units lie in the same or parallel planes and merge in a common plane. In this reflector the exterior and interior trihedral angles are congruent and the apices of the interior angles are directed towards the aperture and are and can be in close proximity to the reflector face of a solid prismatic transparent reflector. The adjacent reflecting surfaces, and more particularly those which merge, are similarly oriented.

The reflector embodying this invention, therefore, comprises a series of triple reflectors arranged in contiguous relation to form together merging active reflecting areas. Instead of placing a series of such reflecting units in contiguous relation without reference to the relation of corresponding surfaces of adjacent or even non-adjacent units, they are placed and assembled so as to form together merging active reflecting areas. In accordance with the illustrative embodiment of this invention, the units are so arranged that corresponding surfaces of adjacent units are in the same plane. This will be seen from an inspection of Figure 1 in which, for instance, the corresponding surfaces 8 are in the same plane; while the pairs of surfaces, 20—30, 40—50, and 60—70, etc., are arranged in pairs at right angles to the surfaces 8 and with the surfaces of each pair relatively at right angles.

The above relation holds true generally for the entire reflector. It will be noted, however, that at the margin of the reflector, there is a continuous plane surface 1, which corresponds generally to the surfaces 8, except that the surface 1 is continuous and extends beyond the pairs of surfaces 2—3, 4—5, 6—7, etc. This reflector including the surface 1 is formed by the mold as described in Patent No. 1,591,752 (of the application of which this application is a division) in that the outer marginal mold elements cooperate with adjacent mold elements to form the matrices of complete reflector units up to the edge of the reflector, which is, in this case, edged by an up-standing glass collar 10. This is accomplished by giving the mold elements of the marginal row only one angularly cut face so as to form the continuous surface 1, while the mold elements of the next row are each given a plurality of angularly cut faces to form the reflecting surfaces, 2—3, 4—5, 6—7, etc.

The reflector as shown in Figure 1, therefore, comprises a series of central triple reflector units, having a plane surface which forms one of the reflecting unit surfaces of each unit of the series, and these units have merging reflecting areas. The corresponding reflecting surfaces of adjacent units are formed by a plane surface, and the opposite co-operating surfaces of these units merge in a linearly continuous series. The reflecting surfaces are arranged in adjacent pairs, at right angles to each other, with a single reflecting surface, perpendicular to the first surfaces. The reflector, therefore, comprises two reflectors placed at right angles to each other and with their reflecting surfaces facing one another, one of the reflectors having a plane surface, the other being grooved, the grooves running at right angles to the plane reflector, and each groove being composed of two plane surfaces, placed at right angles to one another.

As fully described in application Ser. No. 650,402, filed July 9, 1923 (now Patent No. 1,671,086, issued May 22, 1928), the surfaces of a central triple reflector are distorted or deviated from those of an optically true, congruent trihedral angle in such a manner as to secure spread reflection. This is preferably accomplished by distorting portions of one or more of the surfaces at varying angles to the axis, or by otherwise varying the same, so that one or more surfaces of the central triple reflector are not optically plane. This may also be accomplished, as stated in said patent and in Patent No. 1,743,834, January 14, 1930, by providing a heterogeneous refracting medium in front of the reflecting surfaces. This feature is also employed in the reflecting device embodying this invention in order to direct a definite spreading beam of substantially uniform intensity back towards and visible to an observer located a substantial distance outside of a line connecting the reflector with the light source.

In accordance with an embodiment of this invention as shown in Figures 1 and 2, a prismatic central triple reflector is shown as constructed of pressed glass, which is cheaply and easily made by the ordinary process of pressed glass manufacture. The right angular relationship of the reflecting surfaces is only approximately maintained, but the surfaces are not optically accurate in the accepted sense of the term, but are purposely only an approximation thereof; it is essential that the surfaces be so formed in order to carry out the purpose of this invention. The mold or matrix of the reflector is, therefore, constructed with the angles approximately accurate, that is, within about one degree of ninety degrees (90°), but not within a second or less, as is required in an optical device if a defined undistorted image is to be secured. The surfaces of the mold are made as plane as is conveniently possible and are given a polish; nevertheless there are minute irregularities in the resulting glass surfaces that cause symmetrical spreading of the light as it is successively reflected upon the three surfaces; the irregularities forming a large number of minute reflecting surfaces of different angles, these surfaces varying sufficiently from a true plane to cooperate together in the multiple reflection of the three surfaces so as to spread the light to a degree, but not varying sufficiently from ninety degrees (90°) to scatter the light out of a defined beam or field.

A reflector suitable for most purposes is secured by giving the mold surfaces the highest possible polish, the grain of the mold metal and the effect of shrinkage of the glass in the pressing operation providing a surface, the reflection from which has about the proper amount of spread. As will, however, be obvious, the spread of the beam and the uniformity thereof can be controlled by the degree of polish, and by controlling the shrinkage in the pressing operation. In accordance with this invention, therefore, the reflector is purposely formed without reference to optical accuracy, in that the angular relation of one or more of the surfaces may deviate from those of an optically true, congruent trihedral angle, but the inaccuracy of the surfaces themselves, depending as it does upon the factors enumerated, will compensate for the inaccuracy of the angular relations of the surfaces, so that the portions of the surfaces are so formed as to compensate for the angular deviation of the surfaces.

A reflector made as described above results in a structure with three total internal reflecting surfaces which triply reflect light impinging upon the front surface of the reflector. Because of the minute variations distributed over the entire series of surfaces, which deviate in various degrees from optical perfection, but which do not deviate sufficiently from an optically true, congruent trihedral angle, to cause complete dissipation of the light, the impinging beam is triply reflected in the form of a spreading beam back towards the source, the spreading being such that the reflected light fills a conical field with the reflector as the apex and with the source of light lying in the axis of the cone. It will be particularly noted that the reflected beam is substantially uniform and is not in the form of a series of pencils of reflected light with intervening dark spaces.

As enumerated in application Serial No. 650,402 referred to, this invention is particularly applicable to signs illuminated from an extraneous source of light, specific uses of such signs being road signs, danger signals at railroad grade crossings and at curves, and tail lights for automobiles, all of which secure their illumination from extraneous sources, such as automobile or other head lights. This invention is particularly applicable for such uses; for, where for instance a road sign or signal is illuminated by an automobile head light, it is highly desirable that the orientation of the surfaces of the various units be the same and that these units have the same maximum range of inclination. This is accomplished in the reflector embodying this invention by the fact that the reflecting surfaces of contiguous units lie in the same plane and that the cooperating surfaces of these units merge in a linearly continuous series while the unit apertures are wholly effective for reflection of normal beams. In traffic signs or signals, the reflectors may form the outline of a letter or symbol, which has vertical and horizontal strokes. By the construction and arrangement of the units as heretofore described, these letters are sharply outlined; for these units form reflectors arranged in parallel rows with the reflectors in a row opposing and relatively at right angles, and with one reflector in each row having pairs of reflecting surfaces arranged in a continuous merging series therealong and cooperating with a continuous series of reflecting surfaces on the opposite reflector. Accordingly, not only are corresponding surfaces of adjacent units similarly oriented, but the unit apertures are formed by the intersection of reflecting surfaces, the intersections of the surfaces of each unit of a row being along lines parallel to the intersection of the same surfaces with surfaces of adjacent units of a row and at right angles to the direction of a row. The complete boundary of an aperture of a unit is formed by the intersection of its reflecting surfaces with reflecting surfaces of the surrounding units; accordingly, not only is each aperture completely effective for the reflection of normal beams, but these apertures merge so as to form a reflecting area, which is completely effective for the reflection of normal beams.

It is obvious that various changes may be made in details of construction without departing from the spirit of this invention; it is, therefore, to be understood that this invention is not to be limited to the specific details shown and described.

Having thus described the invention, what is claimed is:

1. A reflecting device of the character described comprising, opposing reflectors arranged relatively at right angles and collectively along the device, one of said reflectors having pairs of reflecting surfaces arranged in a continuous linearly merging series therealong and cooperating with a continuous series of reflecting surfaces on the opposite reflector, the surfaces of a pair being relatively at right angles, in order to form a series of contiguous units, each of which has a series of reflecting surfaces arranged relatively at right angles and in a circuit around the axis thereof so that the light impinging thereon from a distant source will be successively reflected by the surfaces of the unit about its axis and as a definite beam in the general direction of the light source.

2. A reflecting device of the character described comprising, reflectors arranged in parallel rows, with the reflectors in a row opposing and relatively at right angles, one reflector in each row having pairs of reflecting surfaces arranged in a continuous linearly merging series therealong and cooperating with a continuous series of reflecting surfaces on the opposite reflector, the surfaces of a pair being relatively at right angles and the reflectors in adjacent rows joining and being relatively at right angles, in order to form a series of contiguous units, each of which has a series of reflecting surfaces arranged relatively at right angles and in a circuit around the axis thereof so that the light impinging thereon from a distance source will be successively reflected by the surfaces of the unit about its axis and as a definite beam in the general direction of the light source.

3. A reflector of the character described comprising, a series of contiguous units, each unit having a series of reflecting surfaces arranged relatively at right angles and in a circuit around the axis thereof so that the light impinging thereon from a distance source will be successively reflected by each of said surfaces about the axis of said unit and as a definite beam in the general direction of the light source, corresponding surfaces of adjacent units being similarly oriented and the unit apertures being formed by the intersection of reflecting surfaces of adjacent units.

4. A reflector of the character described comprising, a series of contiguous units arranged in parallel rows, each unit having a series of reflecting surfaces arranged relatively at right angles and in a circuit around the axis thereof so that light impinging thereon from a distant source will be successively reflected by each of said surfaces about said axis and as a definite beam in the general direction of the light source, surfaces of each unit of a row intersecting along lines parallel to the intersection of the same surfaces with surfaces of the adjacent units of the row and at right angles to the direction of the row.

5. A reflecting device of the character described comprising, reflectors arranged in parallel rows, with the reflectors in a row opposing and relatively at right angles, one reflector in each row having pairs of reflecting surfaces arranged in a continuous linearly merging series therealong and cooperating with a continuous series of reflecting surfaces on the opposite reflector and lying in the same plane, the surfaces of a pair being relatively at right angles and the reflectors in adjacent rows being relatively at right angles, one of said reflectors having pairs of reflecting surfaces joining another of said reflectors having the surfaces lying in the same plane, in order to form a series of contiguous units, each of which has a series of reflecting surfaces arranged relatively at right angles and in a circuit around the axis thereof so that the light impinging thereon from a distant source will be successively reflected by the surfaces of the unit about its axis and as a definite beam in the general direction of the light source.

6. A reflecting device of the character described having a series of reflecting units arranged in contiguous relation, each of said units comprising a series of reflecting surfaces arranged relatively at right angles and in a circuit around the axis thereof so that light impinging thereon from a distant source will be successively reflected by said surfaces about said axis and as a definite beam in the general direction of the light source, corresponding reflecting surfaces of contiguous units lying in the same plane and the opposed co-operating surfaces of said contiguous units merging linearly in a continuous series.

7. A reflecting device of the character described, having a series of reflecting units arranged in contiguous relation, each of said units comprising a series of reflecting surfaces arranged relatively at right angles and in a circuit around the axis thereof so that light impinging thereon from a distant source will be successively reflected by said surfaces about said axis and as a definite beam in the general direction of the light source, the corresponding reflecting surfaces of adjacent units lying in a common plane and the opposed co-operating surfaces of said adjacent units lying in relatively right angular relation and merging linearly in a continuous series.

8. A reflecting device of the character described, having a series of reflecting units arranged in contiguous relation, each of said units comprising a series of reflecting surfaces arranged relatively at right angles and in a circuit around the axis thereof so that light impinging thereon from a distant source will be successively reflected by said surfaces about said axis and as a definite beam in the general direction of the light source, the exterior and interior solid angles formed by the reflecting surfaces of the several units being congruent.

9. A reflecting device of the character described, having a series of reflecting units arranged in contiguous relation to form a solid transparent prismatic plate, each of said units comprising a series of square reflecting surfaces arranged relatively at right angles and in a circuit around the axis thereof so that light impinging thereon from a distant source will be successively reflected by said surfaces about said axis and as a definite beam in the general direction of the light source, the apices of the interior angles formed by the reflecting surfaces of the several units being in close proximity to the front face of the plate.

10. A reflecting device of the character described having a series of reflecting units, each of said units comprising a series of square reflecting surfaces arranged relatively at right angles and in a circuit around the axis thereof so that light impinging thereon from a distant source will be successively reflected by said surfaces about said axis and as a definite beam in the general direction of the light source, said units being arranged in contiguous relation with all boundaries of the unit apertures formed by reflecting surfaces.

11. A reflecting device of the character described, having a series of reflecting units, each of said units comprising a series of square reflecting surfaces arranged relatively at right angles and in a circuit around the axis thereof so that light impinging thereon from a distant source will be successively reflected by said surfaces about said axis and as a definite beam in the general direction of the light source, said units being arranged in contiguous relation with the complete boundary of the aperture of a unit formed by the intersection of its reflecting surfaces with reflecting surfaces of the surrounding units.

12. A reflecting device of the character described, having a series of reflecting units, each of said units comprising a series of square reflecting surfaces arranged relatively at right angles and in a circuit around the axis thereof so that light impinging thereon from a distant source will be successively reflected by said surfaces about said axis and as a definite beam in the general direction of the light source, said units being arranged in contiguous relation with the square surfaces of a unit intersecting with square surfaces of the surrounding units so as to form an hexagonal aperture therefor.

13. A reflecting device of the character described, having a series of reflecting units, each of said units comprising a series of square reflecting surfaces arranged relatively at right angles and in a circuit around the axis thereof so that light impinging thereon from a distant source will be successively reflected by said surfaces about said axis and as a definite beam in the general direction of the light source, said units being arranged in contiguous relation with the square surfaces of the several units intersecting so as to form merging hexagonal apertures.

14. In a highway danger signal the combination of two reflectors placed at right angles to each other and with their reflecting surfaces facing one another, one of the reflectors having a plane surface, the other being grooved, the grooves running at right angles to the plane reflector, and each groove being composed of two plane surfaces placed at right angles to one another.

15. A reflector, comprising a series of central triple reflectors having their reflecting surfaces arranged in adjacent pairs at right angles to each other with a single reflecting plane surface perpendicular to said first surfaces.

16. A reflector, comprising, a series of central triple reflecting units having a plane surface which forms one of the reflecting surfaces of each unit of the series.

17. A reflector, comprising, a series of central triple reflecting units having merging reflecting areas, a single plane surface forming the corresponding reflecting face of each unit of the series.

18. A reflecting device of the character described having a series of reflecting units arranged in contiguous relation, each of said units comprising a series of reflecting surfaces arranged relatively at right angles and in a circuit around the axis thereof so that light impinging thereon from a distant source will be successively reflected by said surfaces about said axis and as a definite beam in the general direction of the light source, the corresponding reflecting surfaces of adjacent units being formed by a plane surface.

19. A reflecting device of the character described having a series of reflecting units arranged in contiguous relation, each of said units comprising a series of reflecting surfaces arranged relatively at right angles and in a circuit around the axis thereof so that light impinging thereon from a distant source will be successively reflected by said surfaces about said axis and as a definite beam in the general direction of the light source, the corresponding reflecting surfaces of adjacent units being formed by a plane surface, and the opposed co-operating surfaces of said units merging in a linearly continuous series.

In testimony whereof I affix my signature this 19th day of February, 1926.

JONATHAN C. STIMSON.